(12) United States Patent
Vontell, Sr. et al.

(10) Patent No.: US 7,781,058 B2
(45) Date of Patent: Aug. 24, 2010

(54) REMOVABLE ADHESIVE FOR REPLACEABLE COMPONENTS SUBJECTED TO IMPACT LOADS

(75) Inventors: John H. Vontell, Sr., Manchester, CT (US); Kellee R. Brownlee, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/494,830

(22) Filed: Jul. 28, 2006

(65) Prior Publication Data

US 2008/0026142 A1    Jan. 31, 2008

(51) Int. Cl.
*B32B 7/12* (2006.01)
*B32B 15/04* (2006.01)

(52) U.S. Cl. .................................. 428/343; 428/355 R
(58) Field of Classification Search ................. 428/343, 428/355 R
See application file for complete search history.

(56) References Cited

U.S. PATENT DOCUMENTS

| | | | |
|---|---|---|---|
| 6,235,862 B1 | 5/2001 | Isshiki et al. | |
| 6,304,000 B1 | 10/2001 | Isshiki et al. | |
| 7,273,580 B2 | 9/2007 | Kirsten et al. | |
| 7,541,264 B2 | 6/2009 | Gardner et al. | |
| 2007/0204835 A1 | 9/2007 | Xi et al. | |

FOREIGN PATENT DOCUMENTS

| | | |
|---|---|---|
| JP | 07138538 | 5/1995 |
| JP | 2002187973 | 5/2002 |
| WO | 02/13580 A1 | 2/2002 |
| WO | 2006/048585 A1 | 5/2006 |
| WO | 2006048585 | 5/2006 |
| WO | 2006/093639 A1 | 9/2006 |

OTHER PUBLICATIONS

European Search Report for EP 07252144.6, dated Jul. 30, 2009.

*Primary Examiner*—Victor S Chang
(74) *Attorney, Agent, or Firm*—Bachman & LaPointe, P.C.

(57) ABSTRACT

A process for manufacturing a composite structure includes the steps of disposing a removable adhesive material in contact with a first surface of a reusable composite structure; disposing a first surface of an expendable composite structure in contact with the removable adhesive material to form a composite structure assembly; and curing the composite structure assembly.

2 Claims, 1 Drawing Sheet

REMOVABLE ADHESIVE FOR REPLACEABLE COMPONENTS SUBJECTED TO IMPACT LOADS

GOVERNMENT RIGHTS

The United States Government may have certain rights in the invention pursuant to contract number N00019-02-C-3003 awarded by the United States Navy.

FIELD OF THE INVENTION

The invention relates to adhesives and, more particularly, relates to removable adhesives for replaceable components subjected to impact loads.

BACKGROUND OF THE INVENTION

Gas turbine components can consist of multiple details secondarily bonded with structural adhesives to provide a strong durable bond that meets service requirements. These structures can consist of composite bonded to composite, composite bonded to metal or metal bonded to metal. It is desirable that the most expensive and complex details be designed for full service life and considered reusable while the composite or metallic details designed for partial service life are considered expendable and replaceable.

Adhesively bonded structures required to survive high loading events, e.g., bird strike, must have a structurally capable, durable bond generally negating the concept of using bonding practices designed to weaken the interface. When the expendable component is replaced, the adhesive remaining on the reusable component surface must be removed or prepared to allow bonding. The remaining adhesive is generally difficult to remove and requires mechanical action which increases the risk of damaging the part surface. The removal of the remaining adhesive is particularly difficult when component replacement is performed under field conditions with the jet turbine engine still attached to the aircraft. For this reason the ability of the remaining adhesive to be removable without mechanical action or chemical treatments is preferred.

In many cases the assembled gas turbine components require close dimensional tolerances to ensure proper alignment during further assembly operations and to provide an aerodynamic surface which meets design limits. When working with typical silicone paste adhesives the alignment of the replaceable component to the reusable component during the bonding operation is achieved by tooling which fixtures the components relative to the aerodynamic flow path surface. To reduce the complexity and cost of the tooling it is desirable to have an adhesive with a controlled thickness and limited flow. Additionally when working with paste adhesive the ability to apply the adhesive to the required areas at a controlled dimension requires skilled labor or equipment that can meter and place the adhesive. It is therefore desirable that the adhesive can be easily cut to shape before application and applied to the component with ordinary hand tools.

Therefore, there exists a need for an adhesive that does not require complex and costly tooling associated with prior methods.

SUMMARY OF THE INVENTION

In accordance with one aspect of the present invention, a process for manufacturing a composite structure broadly comprises disposing a removable adhesive material in contact with a first surface of a reusable composite structure; disposing a first surface of an expendable composite structure in contact with the removable adhesive material to form a composite structure assembly; and curing the composite structure assembly.

In accordance with another aspect of the present invention, a process for manufacturing a composite structure broadly comprises disposing a first adhesive surface of a silicone sheet in contact with a first surface of a reusable composite structure; disposing a first surface of an expendable composite structure in contact with a second adhesive surface of the silicone sheet to form a composite structure assembly; and curing the composite structure assembly.

In accordance with yet another aspect of the present invention, a composite structure assembly broadly comprises a reusable composite structure having at least one surface; an expendable composite structure having at least one surface; a removable adhesive releasably disposed between the reusable composite structure and the expendable composite structure.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
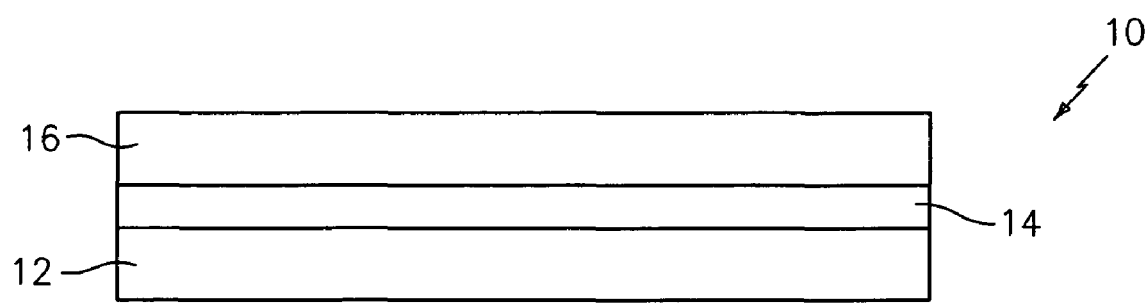
FIG. 1 is a representation of a composite structure of the present invention.

FIG. 1 shows a composite structure 10 of the present invention. Composite structure 10 may be a reusable composite structure 12 such as any component formed from a superalloy material, containing a nickel-based or cobalt-based alloy, and used in a gas turbine engine. An expendable composite structure 16 may be affixed to the composite structure 10 using a quantity of a removable adhesive 14 sufficient to secure together the expendable composite structure 16 and composite structure 12. An "expendable composite structure" means a detail or structure which upon removal is not readily and/or not economical to repair. A "reusable composite structure" means a detail or structure which is of high economic value and is worth repairing by removal and replacement of damaged details.

Generally, the removable adhesive 14 may be an adhesive capable of undergoing manual or mechanical cutting operations (e.g., die cutting) and subsequent manufacturing machining operations without deterioration. The removable adhesive exhibits sufficient tackiness to remain in place when manually applied to a component surface. The removable adhesive also exhibits sufficient flow to accommodate the component dimensional variation between the reusable composite structure and expendable composite structure yet remains in the bond line under pressure to provide a controlled bond line dimension when cured. With respect to aerospace applications, the removable adhesive further possesses the capability to remain bonded during all engine operating conditions including high impact loading events, e.g., bird ingestion or foreign object damage during flight under engine operating conditions. The removable adhesive also possesses the capability to be removed from the reusable composite structure's surface after separation from the expendable component without mechanical action or chemical treatments that could potentially damage the part.

In particular, the removable adhesive 14 may possess mechanical properties such as a tensile strength of about 300-1500 pounds per square inch (psi), and preferably about 850 psi, per ASTM D412, an elongation of about 100-800%, and preferably about 400%, per ASTM D412, a tear strength of about 100-400 psi, and preferably about 250 psi, per ASTM D624, a Modulus of Elasticity of about 500-5000 psi, and preferably about 875 psi, and a shear strength of about 200-2000 psi, and preferably about 500 psi. The adhesive characteristics that facilitate the adhesive's removal are the adhesive composition's high tensile strength and tear strength in combination with the shear strength. This combination of properties allows the adhesive to be removed intact when peeling forces are applied. The removable adhesive 14 may be applied to the reusable composite structure 12 by manual operation as known to one of ordinary skill in the art or, in the alternative, using a mechanical operation as known to one of ordinary skill in the art.

Generally, the composite structure 10 may be assembled using any number of techniques known to one of ordinary skill in the art. For example, reusable composite structure 12 may be prepared for bonding with removable adhesive 14 by any one of a number of cleaning techniques known to one of ordinary skill in the art. If necessary, the removable adhesive 14 may be cut to the dimensions of the reusable composite structure 12. The removable adhesive 14 may then be manually applied or, in the alternative, mechanically and/or using automated equipment and applied to a cleaned, prepared surface of the reusable composite structure 12. The exposed surface of the removable adhesive 14 may then be prepared in the art to receive the expendable composite structure 16 as known to one of ordinary skill. For example, preparing the removable adhesive 14 may require removing a release film to expose the tacky adhesive surface of the removable adhesive 14. Once prepared, the expendable composite structure 16 may be manually applied or, in the alternative, mechanically and/or chemically applied to the prepared surface of the removable adhesive 14 to form the composite structure 10. The resultant composite structure 10 may then be cured using any one of a number of curing techniques known to one of ordinary skill in the art. For example, the composite structure 10 may be cured at a temperature of about 150° F. (65° C.) to about 450° F. (232° C.) and at a pressure of about 25 pounds per square inch to about 250 pounds per square inch. The exact curing conditions will be determined by the chemistry of the specific adhesive. The silicone adhesive may be cured at 300° F. for 90 minutes.

Figure 2:
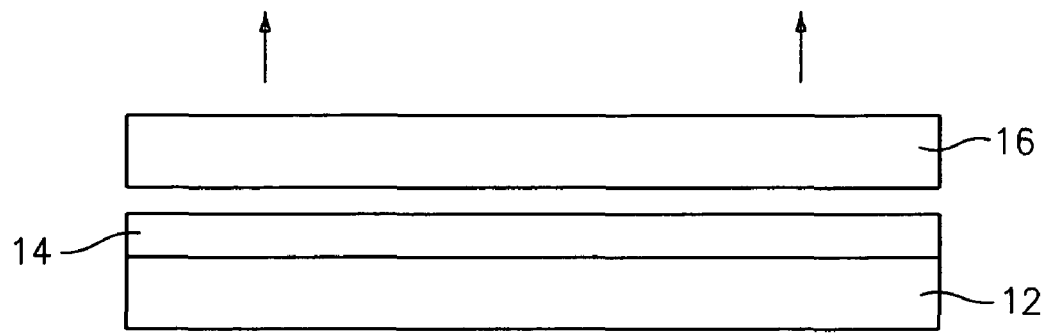
FIG. 2 is a representation of the removal of an expendable composite component of the composite structure of FIG. 1.
Figure 3:
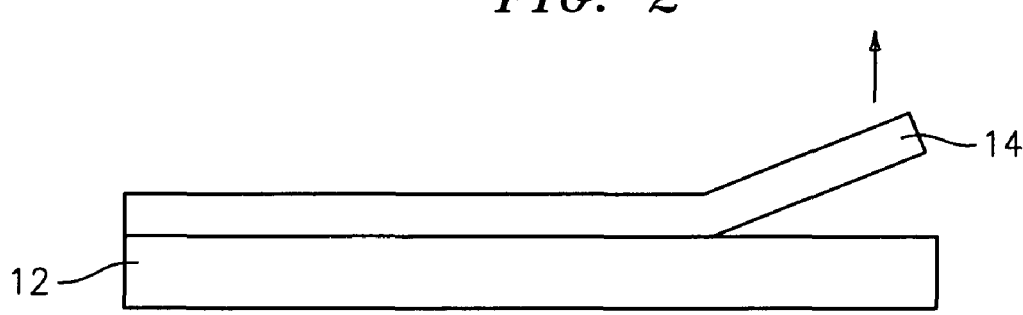
FIG. 3 is a representation of the removal of a removable adhesive of the remaining composite structure of FIG. 2.
Figure 4:
FIG. 4 is a representation of a remaining reusable composite structure.

FIGS. 2-4 illustrate a sequence of steps for the removal of the expendable composite structure 16 and removable adhesive 14 from the reusable composite structure 12. FIG. 2 illustrates the removal of the expendable composite structure 16 from the removable adhesive 14. The expendable composite structure 16 may be removed using any suitable technique known to one of ordinary skill in the art. FIG. 3 illustrates the removal of the removable adhesive 14 from the reusable composite structure 12. The removable adhesive 14 may be removed using any suitable technique that will not cause damage to the reusable composite structure known to one of ordinary skill in the art. FIG. 4 illustrates the remaining reusable composite structure 12 free of substantially any adhesive material and in condition to be rebonded to another expendable composite structure.

EXPERIMENTAL SECTION

Bismaleimide (BMI) resin/graphite fiber composite panels were prepared for bonding by abrading the surface with #80 silicone carbide grit followed by solvent cleaning with isopropyl alcohol. The cleaned BMI resin/graphite fiber composite panels were primed with Chemlok 607 commercially available from the Lord Corporation. A calendared silicone sheet was cut with a razor knife and applied manually to a surface of one BMI resin/graphite fiber composite panel after removing one release film from the calendared silicone sheet. The calendared silicone sheet tackiness was sufficient for the adhesive to remain attached to the panel regardless of the panel orientation. The second release film of the calendared silicone sheet was removed and a second BMI resin/graphite fiber composite panel was added to form a composite structure assembly. The calendared silicone sheet tackiness was sufficient for both BMI resin/graphite fiber composite panels to remain attached regardless of their orientation. The composite structure assembly was then cured in a heated platen hydraulic press at 300° F. (149° C.) under 100 pounds per square inch pressure. Inspection of the cured panel had no indication of polymer flow at the panel edges and no significant thickness reduction of the composite structure could be measured.

The bonded composite structure was double notch shear tested in tension per ASTM 3165 at room conditions failed adhesively at loads ranging from 510 psi to 570 psi. By adhesive failure it is meant that the joint failed at the interface between the composite and the adhesive film. This was determined sufficiently strong to survive bird strike loading when compared to sub element test results performed on paste silicone adhesives with comparable shear strength. The specimens containing the calendared silicone adhesives failed adhesively at the composite interface as preferred for the invention. The remaining silicone of the calendared silicone adhesives was removed by hand pulling the cured sheet. With respect to the composite structure, the cured silicone sheet peeled off in a single piece with no visible residue remaining on the reusable composite surface.

The composite structure of the present invention provides numerous advantages with respect to the assembly of composite structures. First, the removable adhesive can be calendared to a controlled thickness; manually or die cut to complex shapes; and, applied to the component without the need for specialized tools or equipment. As a result, the cost of applying the removable adhesive is reduced. Secondly, the lack of adhesive flow provides a controlled bond line thickness that reduces the complexity and cost of the tooling. Thirdly, the remaining removable adhesive can be removed from the reusable component during depot or field repairs without mechanical action or chemical treatments. This enables field repair and reduces the cost and labor of depot repairs while also reducing the risk of damaging the reusable component surface. Lastly, the high adhesive shear strength of the removable adhesive ensures the bond between the expendable composite structure and reusable composite structure is durable under jet turbine operating conditions and survives high impact loadings events such as bird ingestion or foreign object damage.

One or more embodiments of the present invention have been described. Nevertheless, it will be understood that various modifications may be made without departing from the spirit and scope of the invention. Accordingly, other embodiments are within the scope of the following claims.

What is claimed is:

1. A composite structure assembly, comprising:
   a reusable composite structure having at least one surface;
   an expendable composite structure having at least one surface;
   a removable adhesive releasably disposed between said reusable composite structure and said expendable composite structure, and removable from said reusable composite structure after separation from said expendable composite structure, wherein said removable adhesive exhibits a tensile strength of between about 300 pounds per square inch and about 1500 pounds per square inch according to ASTM D412, a tear strength of between about 250 pounds per square inch and about 400 pounds per square inch according to ASTM D624, a Modulus of Elasticity of between about 500 pounds per square inch and about 5000 pounds per square inch, a shear strength of between about 200 pounds per square inch and about 2000 pounds per square inch, and an elongation of between about 100% and about 800% according to ASTM D412.

2. The assembly of claim 1, wherein said removable adhesive comprises a silicone sheet.

* * * * *